United States Patent
Brendzel et al.

(10) Patent No.: US 6,531,955 B1
(45) Date of Patent: Mar. 11, 2003

(54) ARRANGEMENT FOR PREVENTION OF MOTOR VEHICLE THEFTS

(76) Inventors: Henry Tzvi Brendzel, 5 Gilbert Pl., Millburn, NJ (US) 08041; Michael Stephen Brendzel, 940 Caledonia St., Louisville, CO (US) 80027

( * ) Notice: Subject to any disclaimer, the term of this patent is extended or adjusted under 35 U.S.C. 154(b) by 0 days.

(21) Appl. No.: 09/274,408

(22) Filed: Mar. 23, 1999

(51) Int. Cl.$^7$ .............. H04O 1/00; G05B 19/00
(52) U.S. Cl. ............ 340/5.31; 340/5.72; 340/539; 340/425.5
(58) Field of Search .............. 340/5.31, 425.5, 340/426, 438, 825.69, 546, 10.4, 5.72, 5.28, 539

(56) References Cited

U.S. PATENT DOCUMENTS

| | | | | | |
|---|---|---|---|---|---|
| 4,023,138 A | * | 5/1977 | Ballin | ........... | 340/539 |
| 4,682,062 A | * | 7/1987 | Weinberger | ........... | 307/10.4 |
| 4,754,255 A | * | 6/1988 | Sander et al. | ........... | 307/10.4 |
| 4,818,998 A | * | 4/1989 | Apsell et al. | ........... | 342/444 |
| 4,940,964 A | * | 7/1990 | Dao | ........... | 340/438 |
| 5,382,948 A | * | 1/1995 | Richmond | ........... | 340/825.36 |
| 5,604,384 A | * | 2/1997 | Carlo et al. | ........... | 307/10.5 |
| 5,686,883 A | * | 11/1997 | Mutoh et al. | ........... | 340/426 |
| 5,801,614 A | * | 9/1998 | Kokubu | ........... | 340/425.5 |
| 5,831,530 A | * | 11/1998 | Lace et al. | ........... | 340/568.5 |
| 5,905,432 A | * | 5/1999 | Greene | ........... | 340/426 |
| 5,959,540 A | * | 9/1999 | Walter | ........... | 340/5.64 |
| 5,969,596 A | * | 10/1999 | Wu | ........... | 340/426 |
| 6,049,269 A | * | 4/2000 | Byrd et al. | ........... | 340/426 |
| 6,101,428 A | * | 8/2000 | Snyder | ........... | 701/2 |

* cited by examiner

Primary Examiner—Brian Zimmerman
(74) Attorney, Agent, or Firm—Henry Brendzel

(57) ABSTRACT

The risk of vehicle theft is substantially diminished with an arrangement employs a decoder that is integrally coupled to, or embedded in, one or more operating elements of a vehicle that are controlled with an electrical signal. The decoder is constructed to be responsive to an encoded signal that is generated with a security device, such as a keypad.

26 Claims, 2 Drawing Sheets

ARRANGEMENT FOR PREVENTION OF MOTOR VEHICLE THEFTS

TECHNICAL FIELD

This invention relates to control system and, more particularly, to system for preventing theft of a motor vehicle.

DESCRIPTION OF THE PRIOR ART

Current designs for motor vehicles typically include a mechanical lock combination. The lock is engaged to a mechanical arm of an electrical switch and rotation of the arm, which is enabled by inserting a proper key in the lock and rotating the arm, in turn, enables the electrical systems that operate the vehicle's ignition. This is insufficient to prevent theft of vehicles because it is possible to gain access to the back of the lock and duplicate the switch connections with "clip" leads.

Many patents have been issued to overcome the problem of stolen vehicles, and one recent patent is U.S. Pat. No. 5,861,799, and this patent cites oer two dozen other patents. None of them completely solve the aforementioned problem.

To illustrate, the '799 patent describes an arrangement where an element is interposed in the lead that normally goes from the ignition switch to circuitry that enables the operation of the vehicle. This element includes keypad 22 that is installed on a vehicle's dashboard, and a circuit board 36 that determines whether a PIN code that is entered through the keypad is correct. If it is not, the vehicle's operation is not enabled. The housing in which circuit board 36 is attached to the keypad is sealed so that it cannot be invaded. As depicted in the patent's FIG. 2, it appears that no access is available to the leads that connect keypad 22 to circuit board 36.

The output of circuit board 36 is provided via a pair of leads 32, which are extended to a solenoid in the vehicle's fuel tank. Those leads provide current for the solenoid. Specifically, when the correct PIN code is provided, current is caused to flow through leads 32 and the solenoid opens access to the engine's fuel line. When the correct PIN code is not provided, no current is caused to flow and the solenoid remains in its normal, fuel-off, position.

Alas, this forms a weak link of the system. A thief can easy gain access to leads 32, and a simple severing of leads 32 from housing 34 allows the thief to inject a current and cause the solenoid to engage and allow fuel to flow. Worse than that, one of the benefits that the '799 patent touts is the ability of a pursuing police vehicle to stop a vehicle's movement. This ability is enabled by the circuit board's ability to receive a signal from the pursuing police vehicle. Unfortunately, the above-mentioned approach for a thief to activate the solenoid also nullifies this touted ability.

SUMMARY OF THE INVENTION

The problems found in prior art approaches are overcome, and an advance in the art is achieved with an arrangement that relies on other than DC signals to be communicated to at least one operating element of a vehicle that is responsive to electrical signals. More specifically, in accord with the principles disclosed herein, one or more operating elements of a vehicle are integrally manufactured with, or integrally coupled to, a decoder that is responsive to encoded (non-DC) control signals. The encoded signals are generated with an encoder that is activated via a security element such as a keypad. Only when a correct PIN code is presented to the keypad will the encoder be activated and generated the appropriate encoded control signal or signals.

DETAILED DESCRIPTION

A motor vehicle has various parts that contribute to the operation of the vehicle. Some are controlled mechanically, some are controlled electronically, and some are controlled with a combination of both. Almost all controls are DC in nature. That is, even in connection with components that are controlled by a microprocessor, DC control signals are applied to activate the processor, and a DC control, or a relatively simple level, or on/off, control is the result of the microprocessor computations.

In accordance with the principles of this invention, electronic decoders are embedded in, or physically coupled to, one or more components of the vehicle. By "embedded in", or "integrally coupled to" we mean that the electrical control points of such current-day components, which are normally accessible to a person (mechanic, or a thief) are instead coupled to the decoder, and the physical arrangement is such that these control points are essentially totally inaccessible to a person. By "essentially totally inaccessible" we mean at least that so much time is required to gain useful access to the inaccessible electrical control points, that a thief would expose himself or herself to a significant risk of being caught in the act. The embedding is further arranged so that the inputs that are applied to the decoders are not mere presentation of a battery voltage or withholding of the battery voltage, are not mere adjustable voltage levels, and are not relatively simple on/off signal sequences (e.g. such as the signals for filing spark plugs). Rather, the signals applied to the decoders are complex signals, perhaps digital, that cannot be easily mimicked by an interloper.

Correspondingly, an encoder is installed in the vehicle, and coupled to the decoder. The encoder develops the complex signal that the decoder responds to.

Figure 1:
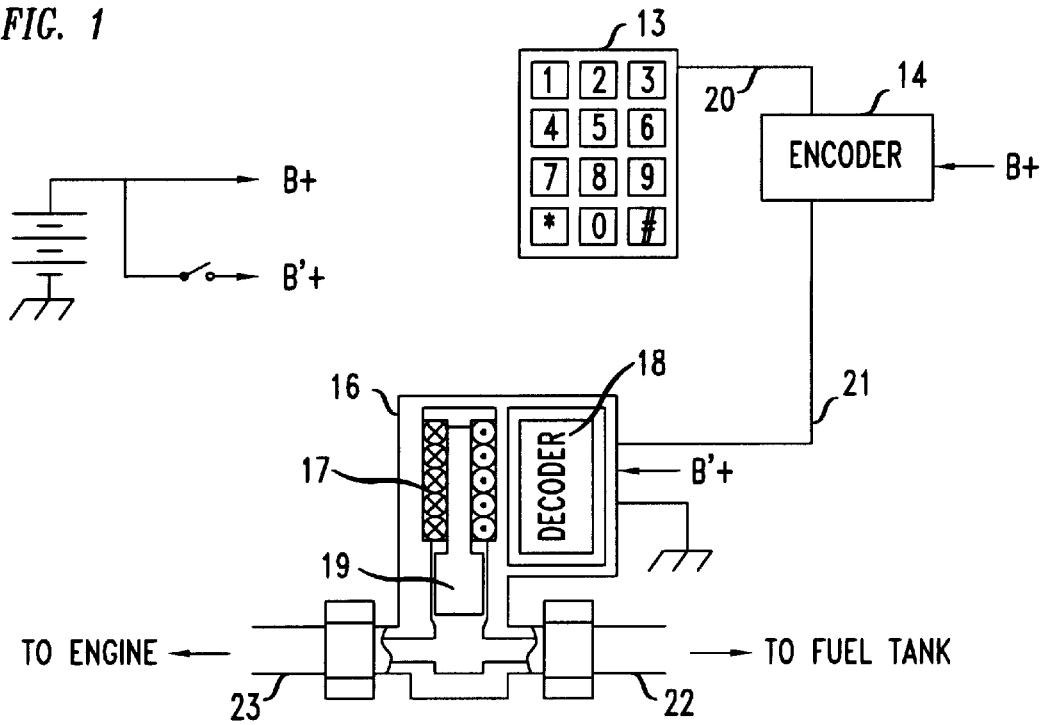
FIG. 1 illustrates an embodiment that that controls fuel flow.

FIG. 1 presents one embodiment in conformance with the principles of this invention, where a dashboard keypad 13 communicates with encoder 14. The bundle of wires from the keypad (represented by line 20) are applied to an encoder 14, and encoder 14 outputs a signal onto line 21. Line 21 is extended to fuel control valve 16 that is interposed anywhere between the fuel tank and the fuel injection system (or vehicleburetor). More specifically, line 21 is extended to a decoder 18 that is within valve 16.

Within fuel valve 16 there is a gate valve plunger 19 which, when it is pulled up, allows the flow of fuel from fuel line 22 to fuel line 23. Gate valve plunger 19 is pulled up by action of solenoid 17 (when current is made to flow through the solenoid). When current does not flow, a spring (not shown, for sake of clarity) forces plunger 19 to its down position, which blocks the flow of fuel from line 22 to line 23.

Advantageously, as indicated above, decoder 18 is integrally coupled to solenoid 17 and, perhaps even manufactured integrally with solenoid 17; in other words, embedded in solenoid 17. The only way to activate solenoid 17 is to provide proper signals to decoder 18. It should be understood, of course, that while valve 16 is illustratively placed between the fuel tank and the fuel injection system in FIG. 1, the integrally manufactured valve 16 can be manufactured within the fuel tank (as depicted in the aforementioned '799 patent) or within the fuel injection system.

In FIG. 1, encoder 14 has two functions. The first one is to ascertain whether the proper PIN code was keyed-in, and the second is to provide a coded signal on line 21. The function of determining whether the proper PIN code was keyed-in is well known in the art and, therefore, is not further treated herein. As for the coding of the signal on line 21, almost any encoding will fulfill the objective of the apparatus, as long as it is complex enough. We consider a simple square wave to not be complex enough.

The signal developed by encoder 14 can be analog or digital. If analog, encoder 14 can, illustratively, generate a particular collection of tones, with particular amplitude relationships between the tones. For example, encoder 14 may develop 8 tones of different frequencies with each tone having an amplitude value between 1 and 10, in steps of 1. This provides $8^{10}$ combinations. In such an embodiment, decoder 18 comprises a plurality of narrow band filters, amplifiers to compensate for the different relative amplitudes of the tones, and comparator circuits. As long as the amplitudes of all of the compensated tones are within a specified threshold of each other, decoder 18 accepts the input signal as valid. Otherwise, it rejects the input signal as invalid. Advantageously, if the input signal is other than zero and is rejected, decoder 18 may disable itself for some relatively long time, to disallow repeated attempts at "breaking the code," and/or activate a built in alarm. For example, an audible alarm, or a silent alarm that sends a message to the police.

If encoder 14 is to operate in the digital domain, it can be designed to develop a set string of bits; for example, the string 11000101010011011100111. Decoder 18 is then tuned to accept only this string as valid, and any other applied string is considered to be an invalid attempt to "break the code." In the above-illustrated example where the string consists of 23 bits, there are $2^{23}-1$ viable combinations (over 8 million). It is noted that if the PIN consists of, for example, 7 digits, the communication along line 21 is more secure than the PIN code itself. That is, it would make more sense for a "want-to-be" thief to try different combinations of the PIN code than to try to apply different combinations of signals to line 21.

Decoder 18 may be designed to have one of a number of response types to a valid input signal. One type of response may be a latching of a relay, or a flip-flop to an "on" state. The relay is released, or the flip flop is reset, when the ignition key is turned off. This type of a design is reflected in FIG. 1 by the connection of the B'+ signal to decoder 18 (the voltage B'+ disappears when the ignition key is turned off, allowing the relay to unlatch, or the flip-flop to assume the "off" state). Another type of response may be a temporary latching of a relay or a flip-flop (a monostable multivibrator might be a good replacement for a temporarily latching flop-flop). With such a response, encoder 14 is required to repeatedly provide its enabling signal to decoder 18. When decoder 18 fails to receive the expected signal, it disables the operational control element that it controls. This latter type of response has some clear advantages, but also some disadvantages. The choice of the selected design is left to the practitioner.

Figure 2:
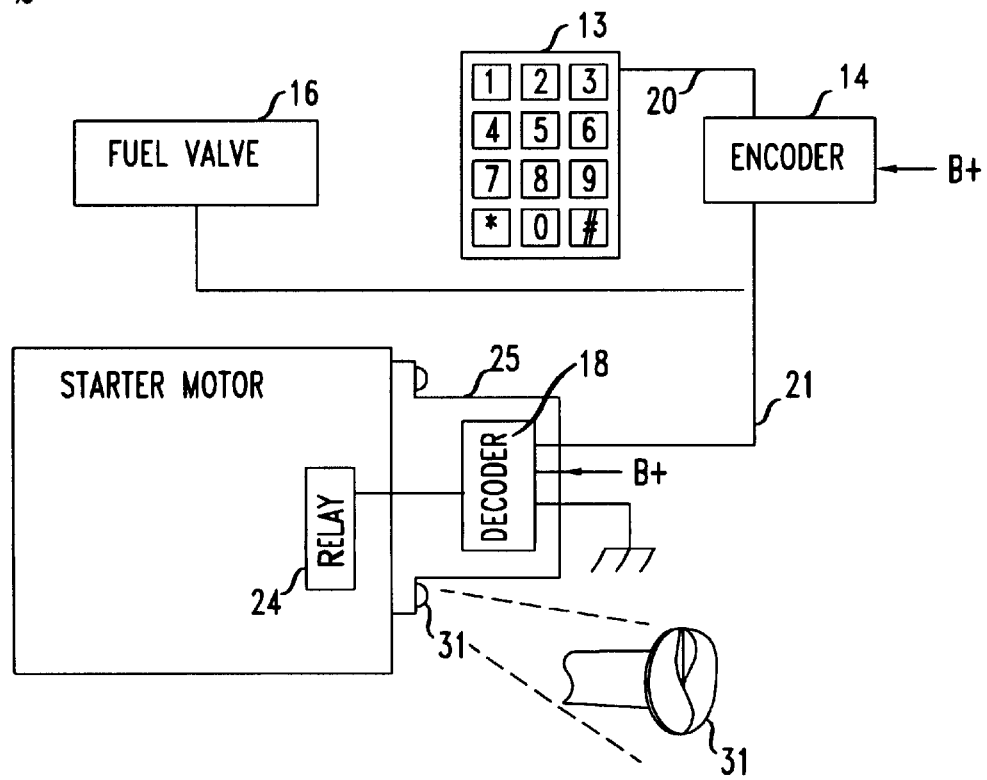
FIG. 2 presents an embodiment for controlling the starter motor's relay.

The above disclosure, which relates to FIG. 1, is directed to the notion of controlling fuel flow. It should be understood that control of fuel flow is but one way to control whether a vehicle is operational or not. There are many points in a vehicle where reception of a signal is necessary for the vehicle to be operational. Each of these points is a candidate for applying the principles disclosed herein. For example, to start the vehicle's engine, the ignition key applies a battery voltage to a relay in the starter motor (low current path). The engaged relay applies the battery voltage to a solenoid that engages the rotor of the starter motor to the engine, and also applied the battery voltage to the stator coil of the starter motor (high current path) which turns the stator motor and the engine. An arrangement showing the engine's starter motor and its internal relay 24, is depicted in FIG. 2. An important aspect of the FIG. 2 arrangement is that decoder 18 is within a housing 25 that is integrally coupled to the starter motor (so that the battery connection to relay 24 is inaccessible, except through decoder 18). This intends to demonstrate that the benefits of this invention can be obtained by retro-fitting existing vehicles. when vehicles that are already in use are to be upgraded. Of course in new vehicles, decoder 18 can be integrally manufactured within the starter motor.

Housing 25 is merely illustrative of one approach for the integral coupling of the decoder to the vehicle's component that the decoder is to enable or disable. Housing 25 can be welded to the component, or it can be connected with machine screws that can be tightened with a screwdriver but cannot be loosened with a screw driver, as depicted in FIG. 2 (the enlargement of screw head 31).

Also shown in FIG. 2 is a connection from encoder 14 to fuel valve 16. This intends to convey the notion that the principles of this invention extend to multiple decoders that may be responsive to a single encoder. A skilled artisan would realize the a plurality of encoders is also feasible, all being activated by the decoding of the PIN code.

Figure 3:
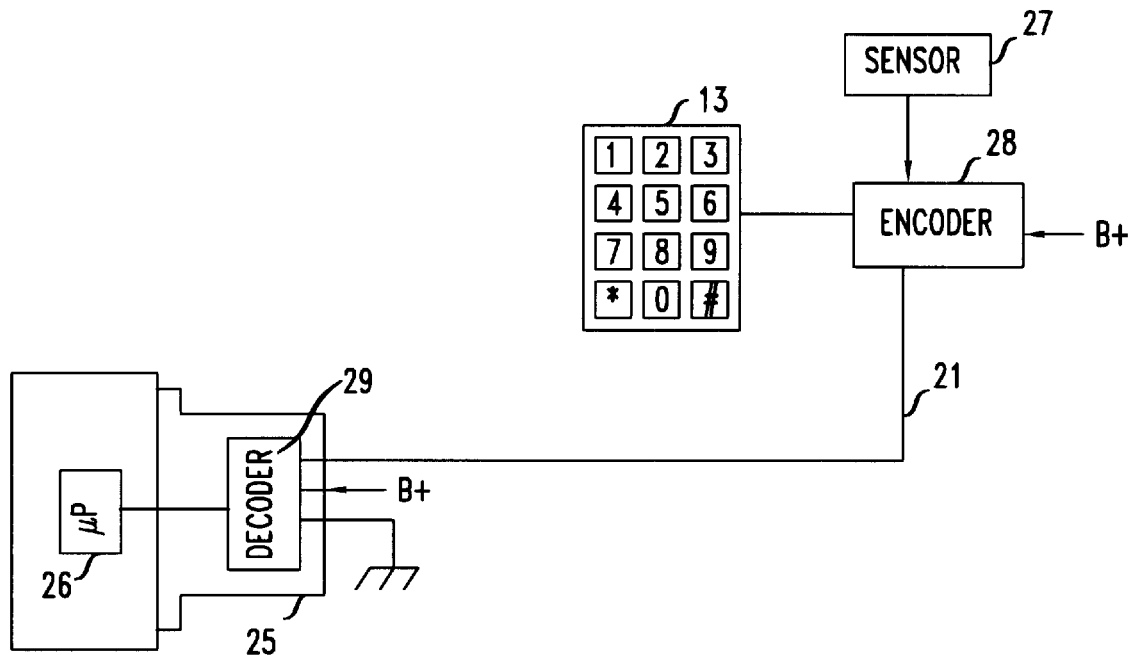
FIG. 3 shows an arrangement for controlling a microprocessor that, in turn controls the operation of a vehicle.

Another example is shown in FIG. 3. In this example, the point of control requires a signal other than a mere a battery voltage. In FIG. 3 this is illustrated with a lead from a microprocessor 26 that controls the vehicle's operation and is responsive to various sensors, such as sensor 27. In this embodiment, the encoder assumes a third function—that of communicating information other than "its OK to have the vehicle operational." More specifically, encoder 28 and decoder 29 in FIG. 3 are different from encoder 14 and decoder 18 of FIG. 1 in that, in addition to the security function that is performed in the communication between the encoder and the decoder, the signal of sensor 27 must be communicated to microprocessor 26. Performing such a function is quite conventional, of course, for those who are skilled in the art of communication. Illustratively, if sensor 27 provides a changeable analog signal, encoder 28 needs to merely sense this voltage, encode it, and send the encoded signal to decoder 29. Decoder 29 decodes the signal, and recovers the analog signal of sensor 27. If the communication between encoder 28 and decoder 29 is digital, the sensing operation includes A/D conversion, the encoding may be a mere encryption of the digital signal that represents the sensor's analog voltage, the decoding is a decryption of the received signal, and recovery of the sensor's analog signal comprises conventional D/A conversion.

From the above, one may realize that it is quite easy to create an embodiment in accord with the principles of this invention where the weakest link in the security chain is the PIN combination. From this realization one can also realize that even if the leads emerging from keypad 13 are exposed, the security of the arrangement is not diminished. Extending this notion further, one might realize that the security of the arrangement is actually not diminished by applying the secret PIN code directly to decoder 18. This is illustrated in FIG. 4, where the seven leads of keypad 13 (one for each row and for each column) are applied to decoder 18.

Figure 4:
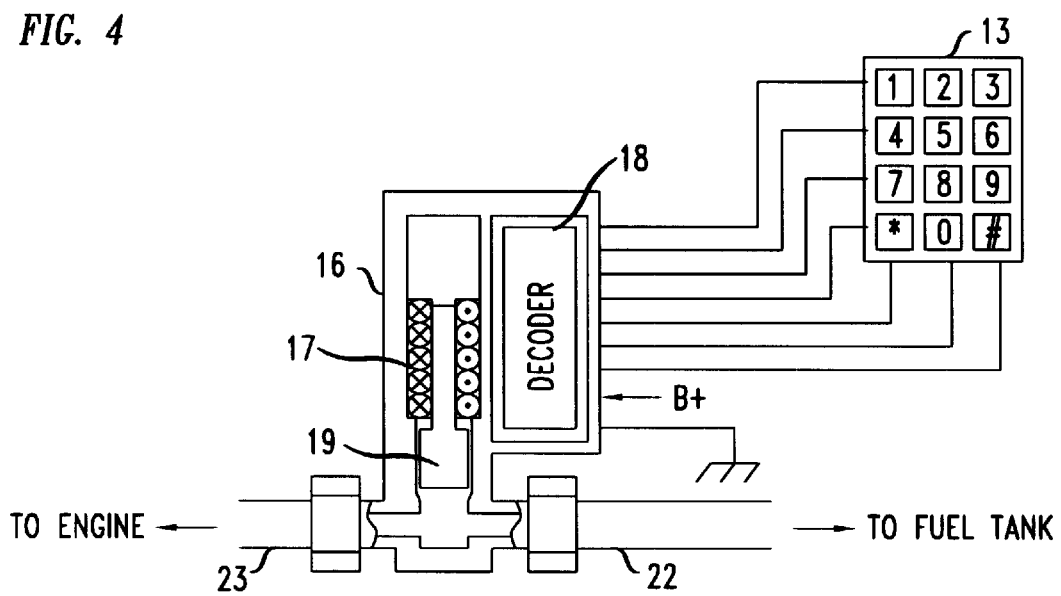
FIG. 4 presents an arrangement where encoding is embodied in the PIN code that needs to be applied at a keypad.

A skilled artisan will realize that the seven keypad leads of FIG. 4 can be replaced with one lead, with the signals of the seven leads multiplexed onto a single lead with the aid of an encoder—resulting, effectively, in the arrangement depicted in FIG. 1. In other words, encoder 14 of FIG. 1 may be merely a means for multiplexing the seven signals developed by keypad 13.

Any commercially viable method for preventing theft must take into account the fact that vehicle parts can malfunction. A particular difficulty occurs when either element 15 needs to be replaced or element 16 needs to be replaced, because decoder 18 must respond to the signal of encoder 14. One solution may be for elements 15 and 16 to be sold as pairs, much like locks are sold with matching keys. Another approach is for each encoder to have a unique code that effectively specifies the particular encoding that it was manufactured with, and for each decoder to have a unique code that effectively specifies the particular encoding to which it responds. When one of the parts needs to be replaced, a person would need to buy a replacement part that has a compatible serial number.

Of course, it is not reasonable to expect that each of the multitude of stores that vehiclery vehicle parts, or even each of the multitude of dealerships of a particular vehicle make, would vehiclery the huge number of different encoders and decoders that can be manufactured. One approach for solving this problem is to manufacture programmable encoders and decoders (together with their integrally manufactured parts such as fuel valve 16). Decoder 18, for example, may be a microprocessor that accepts a given input string as the password for entering a subroutine that reprograms the decoder to accept an applied sequence as a valid sequence. A programming apparatus that is installed in a dealership can then take a virgin decoder, and program it to match a particular encoder 14 with which it will need to interact. After the decoder is programmed, the reprogramming subroutine may be erased, or disabled. The programming apparatus contains a decryption apparatus that accepts the serial number of encoder 14, decrypts it to ascertains how decoder 18 should be programmed, and appropriately programs the virgin decoder. To maintain security over the decryption apparatus, it itself can contain an enablement module that disables the apparatus unless, or until, a secret encryption key is provided—which can be so provided to the dealership by the manufacturer of the programming apparatus.

In the FIG. 4 embodiment, where there is no encoder, and decoder 18 is merely responsive to the PIN code, a replacement decoder 18 can simply specify to the purchaser the PIN code to which it responds. To activate the vehicle, the purchaser/user needs to merely employ the new PIN code. In the alternative, the purchase may specify a PIN code, and a virgin decoder can be programmed to match the desired code.

As disclosed herein, the decoder of this invention has the function of enabling or disabling the vehicle. It can have additional features as well. As indicated above, it can have an audible alarm feature. That would tend to fend off at least some thieves. It can also have a silent alarm and/or alarm and tracking feature. This feature aims to recover hijacked vehicles. For example, a driver of a vehicle who is coerced to activate the vehicle can activate the vehicle with a secondary code. The secondary code activates the vehicle and also activates a transmitter. The transmitter can even include a global positioning system receiver and include the GPS position in the transmitted signal. Decoder 18 that includes a receiver for determining the decoder's global position and a transmitter for sending this information to a chosen party, such as a police car, can be easily adapted to prevent tampering with the transmitting antenna. Since the same antenna receives the GPS information, when receptions stop, decoder 18 can disable the vehicle.

The above discloses the principles of this invention by means of a number of illustrative embodiments. It should be understood, however, that various modifications can be made, and enhancements incorporated, without departing from the spirit and scope of this invention. For example, a skilled artisan would realize that the key pad serves as a security device, and that other security devices can be employed with a similar effect. For example, a keypad 13 can be replaced with a voice response system that is trained to recognize one, or a small number of individual speakers (e.g., four drivers of a family). When a preassigned phrase is recognized by the encoder (FIG. 1) or the decoder (FIG. 4), the vehicle is enabled. Also, line 21 can be replaced with a wireless communication path between encoder 14 and decoder 18. Moreover, if encoder 14 is portable and in personal possession of the vehicle's owner, some may consider an embodiment that does not even employ a keypad.

Also, the above disclosure concentrates on the decoder disabling the vehicle's operation, or enabling it. Actually, an in-between state is quite useful as well. For example, decoder 18 can be designed so that when it fails, the car's operation is only partially disabled; i.e., allowing a vehicle to travel at not more than 10 mph; whereas when an incorrect code is presented, the vehicle is disabled completely. Of course, to achieve such a capability, the vehicle's element that is controlled must be carefully chosen. Probably, it would not be the starter motor. More likely, it would be an element in the fuel system, such as the fuel pump, or a fuel valve solenoid as described above.

What is claimed is:

1. A vehicle including an engine and various electrical and electromechanical components that control operability of said vehicle, the improvement comprising:

a component that requires a specified control signal applied to an electrical operational control lead thereof in order to continue operating said vehicle once said engine of said vehicle is started, and a decoder coupled to said component that, only while a preselected coded activation signal is applied to said decoder, supplies said specified control signal to said electrical operational control lead, where said electrical operational control lead is made inaccessible by operation of said coupling.

2. The vehicle of claim 1 where said encoder accepts a control signal from a sensor of said vehicle, encodes said control signal to form said coded activation signal, and said decoder generates said specified control signal from said coded activation signal.

3. The vehicle of claim 1 where said decoder and said electrical operational control lead are embedded in said component.

4. The vehicle of claim 1 where said coded activation signal comprises logic signals.

5. The vehicle of claim 1 where said component is selected from a set containing a fuel valve, a fuel pump, a microprocessor that controls operation of said vehicle, a fuel injection system, a starter system, a brake control system, and an electrical distribution system that enables operability of said vehicle.

6. The vehicle of claim 1 where said decoder includes wireless communication circuits.

7. The vehicle of claim 1 further comprising an encoder for generating said coded activation signal, even once said engine is started, in response to signals from a keypad, signals from a microphone, or signals received from a transmitter.

8. The vehicle of claim 7 where said encoder comprises a keypad with a plurality of signal leads connected to said decoder.

9. The vehicle of claim 7 where said encoder or said decoder includes a speech recognition module.

10. The vehicle of claim 9 where said speech recognition module is responsive to voice commands of a particular person.

11. The vehicle of claim 7 where said encoder accepts a control signal that represents a sequence of key strokes from a predetermined set of key strokes, encodes said control signal to form said coded activation signal and, via said decoder, relays said electrical operational control signal to said electrical operational control lead of said component.

12. The vehicle of claim 1 where said coded activation signal is a stream of bits.

13. The vehicle of claim 1 where said decoder includes alarm-raising means that is activated when a signal applied to said decoder is other than said preselected activation signal.

14. The vehicle of claim 1 where said decoder enables operability of said vehicle in response to said preselected coded activation signal as well as in response to a secondary preselected activation signal, said decoder further comprising a transmitter that is activated in response to said secondary preselected activation signal.

15. The vehicle of claim 1 further including means for applying said preselected coded activation signal to said decoder while said engine propels said vehicle.

16. A method for operating a vehicle comprising the steps of:
   supplying to an encoder a security input,
   in response to affirmative verification of said security input, said encoder developing an encoded signal that continues while said vehicle is operating after starting,
   communicating said encoded signal to a decoder that is integrally coupled to an operational element of said vehicle.

17. The method of claim 16 where said communicating is wireless, or by wire.

18. The method of claim 16 where said encoded signal communicates a sensor signal to said decoder.

19. A vehicle including an engine and various electrical and electromechanical components that control operability of said vehicle, the improvement comprising:
   a component that requires a specified control signal applied to an electrical operational control lead thereof in order to continue operating said vehicle once said vehicle is started, and
   a decoder coupled to said component that, only while a preselected coded activation signal is applied to said decoder, supplies said specified control signal to said electrical operational control lead.

20. A vehicle control system comprising:
   a decoder adapted to be coupled to a component of said vehicle stops an engine of said vehicle from being operational in ice absence of a specified control signal to an electrical operational control lead of said component, where said decoder applies said specified control signal to said electrical operational control lead when a preselected coded activation signal is applied to said decoder; and
   means to connect said decoder to said component that removes access to said electrical operational control lead of said component so that said specified control signals cannot be applied to said electrical operational control lead by means other than said decoder.

21. The system of claims 20 where said decoder includes alarm-raising means that is activated when a signal applied to said decoder is other than said preselected coded activation signal.

22. The system of claim 20 where said means to connect integrally couples said decoder to said component.

23. The system of claim 20 where said preselected coded activation signal is an encrypted transformation of a representation of a signal.

24. The system of claim 20 further comprising an encoder for generating said preselected coded activation control signal.

25. The system of claim 24 where said encoder includes a port for receiving said specified control signal and for relaying said specified control signal, via said decoder, to said electrical operational control lead of said component.

26. The system of claim 25 where said port is adapted to receive a control signal from a sensor of a vehicle.

* * * * *